US010869462B2

(12) United States Patent
Glenn

(10) Patent No.: US 10,869,462 B2
(45) Date of Patent: Dec. 22, 2020

(54) REVERSIBLY-DISMANTLABLE PET TOY

(71) Applicant: Stephen Glenn, Bentonville, AR (US)

(72) Inventor: Stephen Glenn, Bentonville, AR (US)

(*) Notice: Subject to any disclaimer, the term of this patent is extended or adjusted under 35 U.S.C. 154(b) by 239 days.

(21) Appl. No.: 16/120,379

(22) Filed: Sep. 3, 2018

(65) Prior Publication Data
US 2019/0069520 A1 Mar. 7, 2019

Related U.S. Application Data

(60) Provisional application No. 62/554,544, filed on Sep. 5, 2017.

(51) Int. Cl.
A01K 15/02 (2006.01)
A44B 18/00 (2006.01)

(52) U.S. Cl.
CPC ............ A01K 15/026 (2013.01); A44B 18/00 (2013.01)

(58) Field of Classification Search
CPC .... A01K 15/026; A01K 15/025; A01K 15/02; A63H 3/16; A63H 3/46; A63H 33/048; Y10S 446/901
USPC .......................... 446/369, 371, 376, 390, 901
See application file for complete search history.

(56) References Cited

U.S. PATENT DOCUMENTS

| 5,788,554 | A  | * | 8/1998 | Goodwin | A63H 3/16 446/100 |
| 5,897,420 | A  | * | 4/1999 | Lawrence | A63H 3/16 446/100 |
| 6,887,120 | B2 | * | 5/2005 | Shamitoff | A63H 3/46 24/662 |
| 7,520,793 | B2 | * | 4/2009 | Pillai | A63H 3/16 446/92 |
| 8,997,670 | B2 | * | 4/2015 | Book | D05B 27/08 112/318 |
| 2007/0072513 | A1 | * | 3/2007 | Rothmiller | A63H 3/02 446/369 |
| 2013/0052912 | A1 | * | 2/2013 | Pampliega | A63H 3/16 446/376 |

* cited by examiner

Primary Examiner — Trinh T Nguyen
(74) Attorney, Agent, or Firm — Jeff Cameron; Michael Cameron

(57) ABSTRACT

A reversibly-dismantlable pet toy comprising a hollow body and head, arm, and leg appendages. The body has openings admitting corresponding appendages, each opening having a fastening means corresponding to a complementary fastening means on an associated appendage. Each appendage comprises said complementary fastening means and a strap extending from it which is stuffed into the body during setup and extends from the body during dismantlement. The appendages are inserted and fastened, after which they can be repeatedly removed and re-attached without damaging the toy.

12 Claims, 4 Drawing Sheets

REVERSIBLY-DISMANTLABLE PET TOY

CROSS REFERENCE TO RELATED APPLICATION

This application claims priority to U.S. Ser. No. 62/554,544, filed Sep. 5, 2017 entitled: REVERSIBLY-DISMANTLABLE PET TOY, the contents of which are incorporated herein by reference.

TECHNICAL FIELD

The present invention relates to recreational equipment used to interact with pets.

BACKGROUND OF THE INVENTION

Pet toys come in many varieties, designed for different purposes and the wide ranges of characteristics between and among pets. Dog breeds for example vary widely in size, activity level, chewing habits, and play style. Pet toys include bones, balls, tug toys, training aids, squeaky toys, discs and frisbees, plush toys, sticks, among others.

Toys serve different purposes. Puppies, for instance, need toys they can chew on when they are teething because their gums and jaws become very sore and chewing on things provides them relief. Playing with different toys also encourages exercise, which benefits a pet's overall health. Toys also stimulate pets' minds, discourage problem behavior resulting from boredom and excess energy, and promote dental health.

Distraction toys can be useful for extremely active dogs who need mental stimulation as well as physical exercise. Some examples are food delivery toys, toys stuffed with pet treats, chew challenge toys, and puzzle toys.

A stuffed toy is a toy sewn from a textile, and stuffed with a soft material. They are variously referred to as plush toys, plushies, or stuffed animals, among other names. Textiles commonly used include plain cloth and pile textiles like plush or terrycloth. Common stuffing materials are synthetic fiber batting, cotton, straw, wood wool, plastic pellets or beans. Stuffed toys are made in many different forms, often resembling animals, legendary creatures, cartoon characters or inanimate objects.

In the course of play, toy s often become damaged or destroyed, either through normal wear and tear or purposeful action by a pet, necessitating the purchase of replacement toys.

No product exists which a pet can disassemble over time and with effort which can then be easily re-assembled by the pet-owner, thus providing the pet with an experience resembling or approximating that of destroying a non-reversibly-dismantlable toy, as well as reducing time and money spent by the owner on new toys.

What is desired is an article of recreational equipment which can be dismantled, with some effort, by a pet and then easily re-assembled by the pet-owner. The present invention provides such an article.

SUMMARY OF THE INVENTION

According to one embodiment of the present invention, the reversibly-dismantlable pet toy comprises a hollow body and five detachably connected appendages: a head appendage, left and right arm appendages, and left and right leg appendages: appendage in this context referring to any of the legs, arms or head of said pet toy.

Said hollow body has a substantially ellipsoidal shape and an inner cavity, comprises fastening means corresponding to complementary fastening means on each appendage, and has on its outer surface five openings leading to said inner body cavity, said openings being associated with the head, left and right arm, and left and right leg appendages, respectively, and being positioned on the top, left and right side, and lower left and right side of said body, respectively;

said head appendage comprises a head extremity being shaped to resemble or represent an animal head, a strap securely attached to the body-facing end of said head extremity, said strap extending from the point of its attachment to said head extremity outward in the direction of the body, said head appendage further comprising fastening means corresponding to complementary fastening means on said body:

each of said leg appendages comprises a leg extremity having a substantially ellipsoidal shape, said leg appendage further comprising fastening means corresponding to complementary fastening means on said body, a strap securely attached to the body-facing end of said leg extremity, said strap extending from the point of its attachment to said leg extremity outward in the direction of the body, said leg appendages being mirror images of each other across the longitudinal axis of said body:

each of said each arm appendage comprises an arm extremity having a substantially ellipsoidal shape, said arm appendage further comprising fastening means corresponding to complementary fastening means on said body, a strap securely attached to the body-facing end of said arm extremity, said strap extending from the point of its attachment to said arm extremity outward in the direction of the body, said arm appendages being mirror images of each other across the longitudinal axis of said body.

To use the invention, in one embodiment, the terminal ends of the respective straps of said arm and leg appendages are inserted into the body inner cavity via the respective associated appendage openings: said straps are then pulled through the body and out of the head appendage opening until only the respective arm and leg appendage extremities remain outside said body. Said straps are then pushed through the head appendage opening into the body cavity, thus acting as stuffing for the body, after which the head appendage is attached by pushing the terminal end of the head appendage strap through the head appendage opening into said body cavity until only the head extremity remains outside said body. Said appendages are then fastened to said respective appendage openings. The individual appendages can then be detached and/or removed by pulling, after which they can be re-attached. The fastening means and straps of said appendages provide resistive force when said appendage is pulled outward: said straps additionally allow for intermediate stages of dismantlement between fully attached and fully removed appendages.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

For a better understanding of the present invention including the features, advantages and embodiments, reference is made to the following detailed description along with accompanying Figures, in which.

DETAILED DESCRIPTION

While the making and using of the disclosed embodiments of the present invention is discussed in detail below, it should be appreciated that the present invention provides many applicable inventive concepts which can be embodied in a wide variety of contexts. Some features of the preferred embodiments shown and discussed may be simplified or exaggerated for illustrating the principles of the invention.

According to one embodiment of the present invention, the reversibly-dismantlable pet toy comprises a hollow body and five detachably connected appendages: a head appendage, left and right arm appendages, and left and right leg appendages: appendage in this context referring to any of the legs, arms or head of said pet toy.

Figure 1:
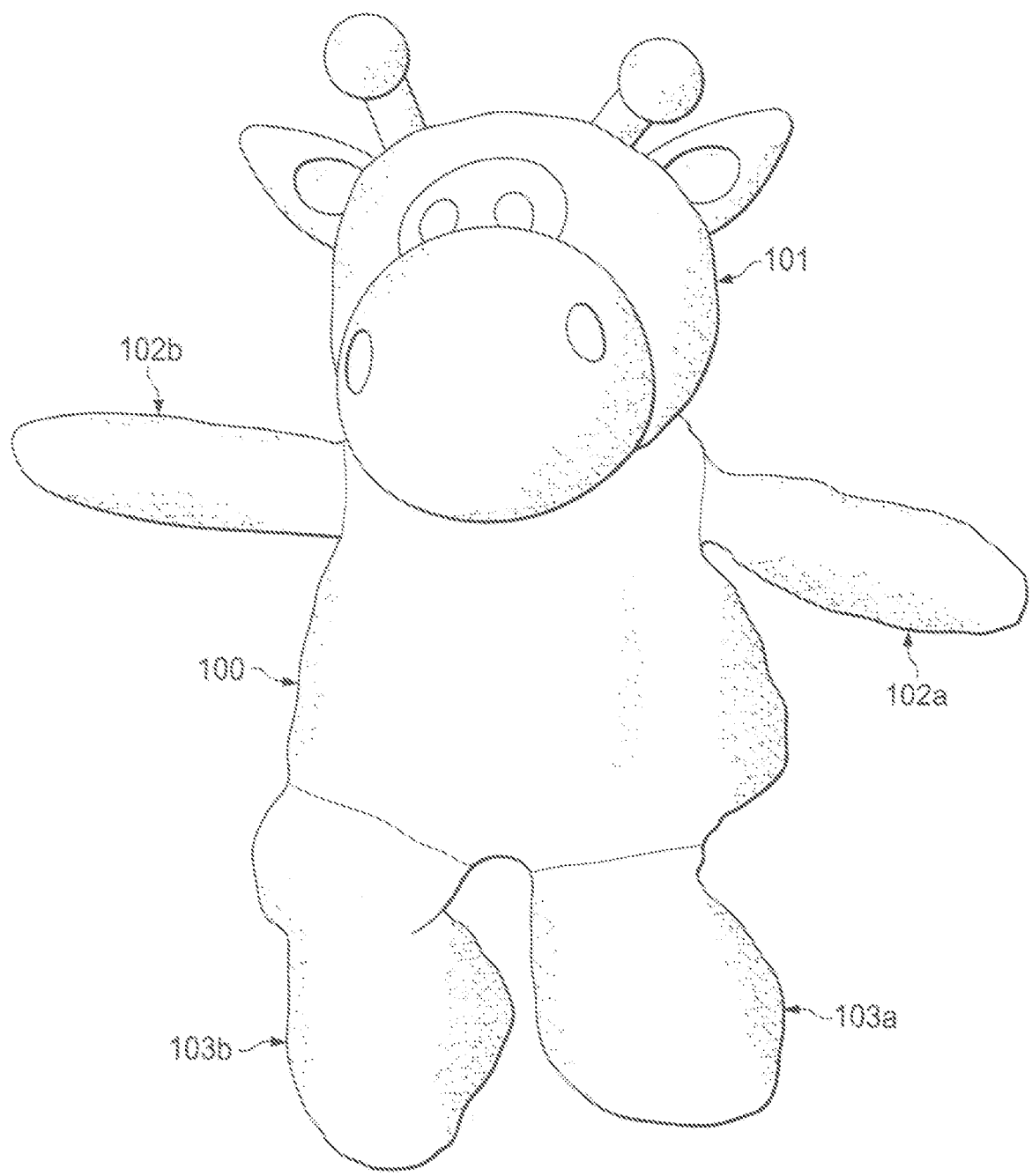
FIG. 1 is a front view of a pet toy in accordance with the present invention with all appendages fully attached.
Figure 2:
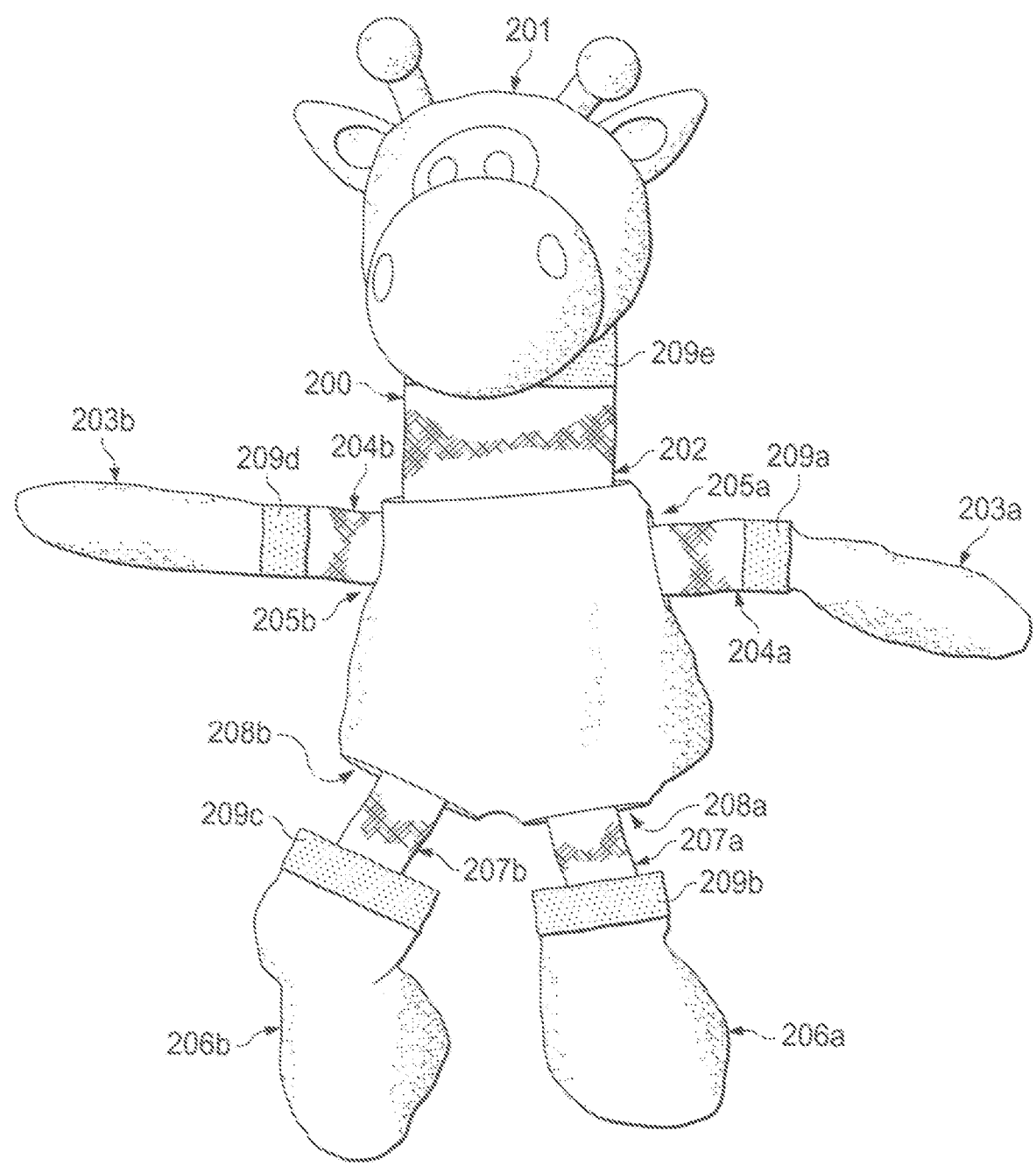
FIG. 2 is a front view of a pet toy in accordance with the present invention with all appendages detached and partially removed.
Figure 3:
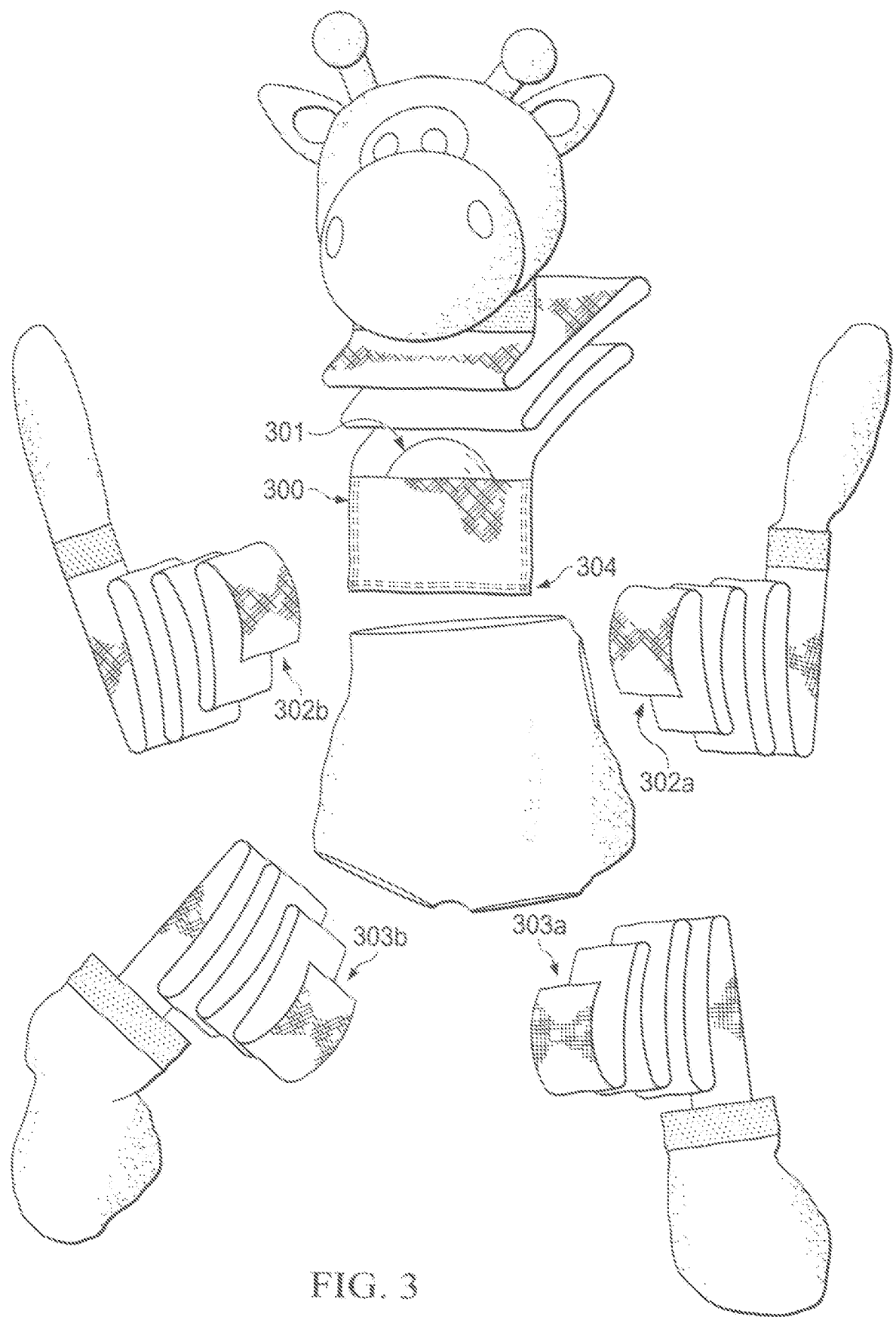
FIG. 3 is a front view of a pet toy in accordance with the present invention with all appendages fully detached and removed.
Figure 4:
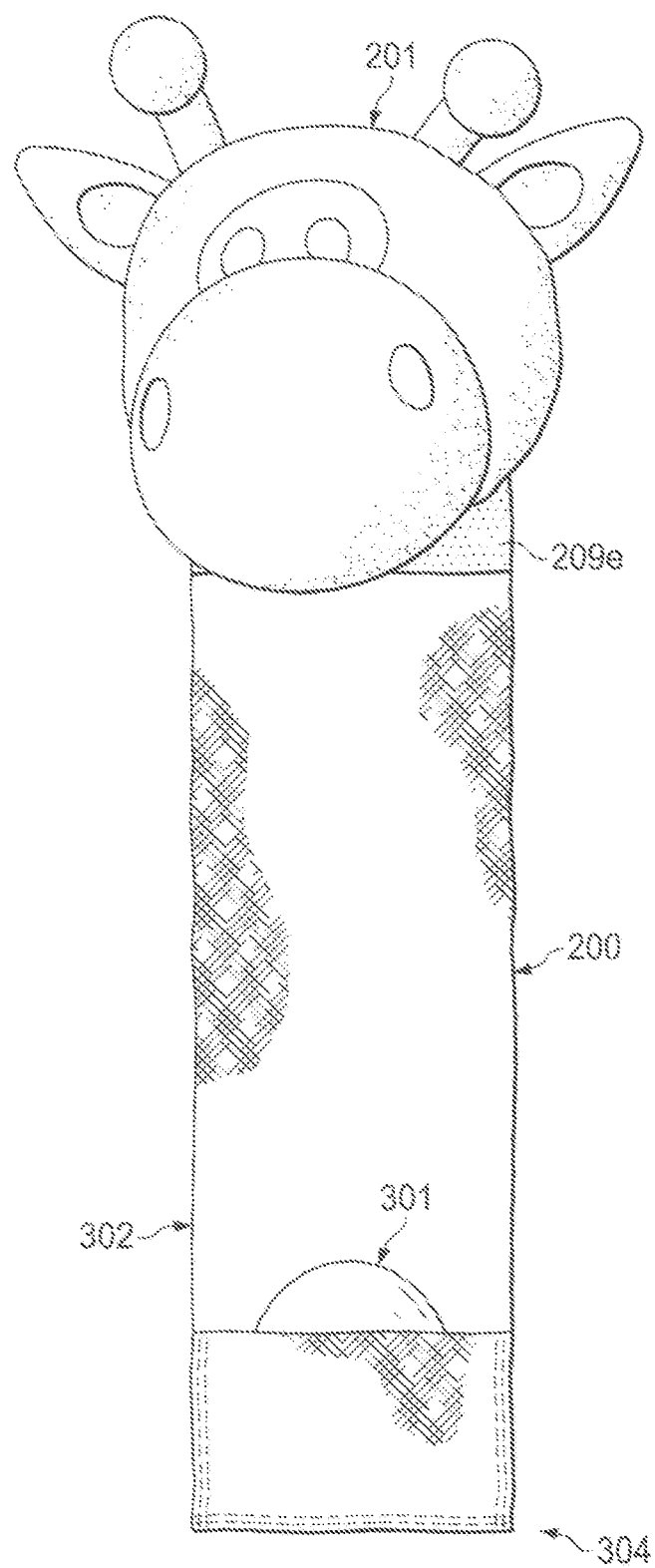
FIG. 4 is a close-up front view of a fully detached head appendage in accordance with the present invention.

Referring to FIG. 1, said pet toy comprises a hollow body 100, said body having a substantially ellipsoidal shape, being made of a textile material such as cloth or plush, comprising fastening means corresponding to complementary fastening means on each appendage, and having on its outer surface five openings leading to an inner body cavity, said openings having elliptical shapes, being defined as the head appendage opening 202, left and right arm appendage openings 205a and 205b, respectively, and left and right leg appendage openings 208a and 208b, respectively, and being configured to receive associated appendages, said head appendage opening being located on top of said body such that the longitudinal axis of said body is coincident with the normal vector of said head appendage opening, said left and right arm appendage openings having normal vectors lying in the plane formed by said longitudinal axis and a vector running width-wise through the body center and being rotated between 20 and 100 degrees away from said body longitudinal axis about said body center, one arm opening normal vector being rotated clockwise and the other counter-clockwise such that said arm openings are effectively mirrored across said body longitudinal axis; i.e., said left and right arm appendage openings are located on the left and right sides, respectively, of the upper half of said body: said leg appendage openings have normal vectors lying in the same plane as those of the arm and head openings and being rotated between 110 and 170 degrees away from said body longitudinal axis about said body center, one leg opening normal vector being rotated clockwise and the other counter-clockwise such that said leg openings are effectively mirrored across said body longitudinal axis; i.e., said left and right leg appendage openings are located on the left and right sides, respectively, of the lower half of said body; said pet toy further comprises a head appendage 101, said head appendage comprising a head extremity 201 having a roughly ellipsoidal shape and being formed to resemble or caricature an animal head, said head extremity being made of a textile material such as cloth or plush and being stuffed with a soft material such as cotton, said head appendage further comprising a head assembly strap 200 securely attached to the body-facing end of said head extremity, said head assembly strap extending from the point of its attachment to said head extremity outward along the longitudinal axis of said head extremity in the direction of the body, said head appendage further comprising a fastening means attachment surface 209e corresponding to a complementary fastening means on said body: said pet toy further comprises left and right leg appendages 103a and 103b, respectively, each leg appendage comprising a leg extremity (206a and 206b for the left and right legs, respectively) having a substantially ellipsoidal shape and being formed to resemble or represent an animal leg or anthropomorphized animal leg, said leg extremity being made of a textile material such as cloth or plush and being stuffed with a soft material such as cotton, said leg appendage further comprising a fastening means attachment surface (209b and 209c for the left and right legs, respectively) corresponding to a complementary fastening means on said body, a leg assembly strap (207a and 207b for the left and right legs, respectively) securely attached to the body-facing end of said leg extremity, said leg assembly strap extending from the point of its attachment to said leg extremity outward along the longitudinal axis of said leg extremity in the direction of the body, said leg appendages being mirror images of each other across the longitudinal axis of said body: said pet toy further comprises left and right arm appendages 102a and 102b, respectively, each arm appendage comprising an arm extremity (203a and 203b for the left and right arms, respectively) having a substantially ellipsoidal shape and being formed to resemble or represent an animal front leg or anthropomorphized animal arm, said arm extremity being made of a textile material such as cloth or plush and being stuffed with a soft material such as cotton, said arm appendage further comprising a fastening means attachment surface (209a and 209d for the left and right arms, respectively) corresponding to a complementary fastening means on said body, an arm appendage strap (204a and 204b for the left and right arms, respectively) securely attached to the body-facing end of said arm extremity, said arm appendage strap extending from the point of its attachment to said arm extremity outward along the longitudinal axis of said arm extremity in the direction of the body, said arm appendages being mirror images of each other across the longitudinal axis of said body.

In an embodiment of the present invention, said fastening means are a detachable hook-and-loop-type attachment system comprising a first planar surface and a second planar surface, said surfaces being oriented such that the normal vectors of said surfaces are coincident and antiparallel, said first surface being defined as the male attachment surface and having a plurality of hooks extending outward, said second surface being defined as the female attachment surface and having a plurality of loops extending outward, said hooks and loops being made of a flexible material said hooks engaging said loops when said surfaces are pressed together, said surfaces being thereby detachably secured. Said surfaces may be curved as long as their geometries are similar enough to allow simultaneous contact between said surfaces over the whole of the attachment face surface area of the smaller of the two surfaces.

With respect to the current invention, said attachment surfaces can be arranged in a variety of ways.

In one configuration, each appendage comprises a male attachment surface and each appendage opening in said body comprises a female attachment surface, said male attachment surface having an annular shape and being arranged radially about the body-facing end of its associated appendage extremity such that the male attachment surface is oriented radially outward from the longitudinal axis of said associated appendage extremity: said female attachment surface having an annular shape and being arranged radially inside its associated appendage opening such that said female attachment surface is oriented radially inward with respect to a normal vector emanating from said associated opening, said male and female surfaces being in contact when said appendage is received by its associated appendage opening and engageable at a point of contact by pressing together, said appendage being thereby detachably fastened to said body such that a pulling force applied to said appendage along its longitudinal axis is perpendicular to the orientation of said attachment surfaces, i.e., the attachment surfaces are pulled past each other rather than apart and away from each other, increasing the amount of time the two surfaces are in contact when being detached and increasing the effort required to detach the associated appendage.

In another configuration, each appendage comprises a female attachment surface and each appendage opening in said body comprises a male attachment surface, said female attachment surface having an annular shape and being arranged radially about the body-facing end of its associated appendage extremity such that the female attachment surface is oriented radially outward from the longitudinal axis of said associated appendage extremity: said male attachment surface having an annular shape and being arranged radially inside its associated appendage opening such that said male attachment surface is oriented radially inward with respect to a normal vector emanating from said associated opening, said male and female surfaces being in contact when said appendage is received by its associated appendage opening and engageable at a point of contact pressing together, said appendage being thereby detachably fastened to said body such that a pulling force applied to said appendage along its longitudinal axis is perpendicular to the orientation of said attachment surfaces. i.e., the attachment surfaces are pulled past each other rather than apart and away from each other, increasing the amount of time the two surfaces are in contact when being detached and increasing the effort required to detach the associated appendage.

In a further configuration, each appendage comprises a male attachment surface and each appendage opening in said body comprises a female attachment surface, said male attachment surface being planar and smaller in width than its associated appendage extremity and being positioned toward the body-facing end of said extremity facing radially outward from same, said female attachment surface being planar and positioned on the inner surface of its associated appendage opening such that said male and female surfaces are in contact when said appendage is received by its associated appendage opening and engageable at a point of contact by pressing together, said appendage being thereby detachably fastened to said body such that a pulling force applied to said appendage along its longitudinal axis is perpendicular to the orientation of said attachment surfaces. i.e., the attachment surfaces are pulled past each other rather than apart and away from each other, increasing the amount of time the two surfaces are in contact when being detached and increasing the effort required to detach the associated appendage.

In another configuration, each appendage comprises a female attachment surface and each appendage opening in said body comprises a male attachment surface, said female attachment surface being planar and smaller in width than its associated appendage extremity and being positioned toward the body-facing end of said extremity facing radially outward from same, said male attachment surface being planar and positioned on the inner surface of its associated appendage opening such that said male and female surfaces are in contact when said appendage is received by its associated appendage opening and engageable at a point of contact by pressing together, said appendage being thereby detachably fastened to said body such that a pulling force applied to said appendage along its longitudinal axis is perpendicular to the orientation of said attachment surfaces. i.e., the attachment surfaces are pulled past each other rather than apart and away from each other, increasing the amount of time the two surfaces are in contact when being detached and increasing the effort required to detach the associated appendage.

In a further configuration, each appendage comprises multiple male attachment surfaces and each appendage opening in said body comprises multiple associated female attachment surfaces, each male attachment surface being planar and smaller in width than its associated appendage extremity and being positioned toward the body-facing end of said extremity facing radially outward from same, and having an associated female attachment surface, said associated female attachment surface being planar and positioned on the inner surface of its associated appendage opening such that said male and female surfaces are in contact when said appendage is received by its associated appendage opening and engageable at a point of contact by pressing together, said appendage being thereby detachably fastened to said body such that a pulling force applied to said appendage along its longitudinal axis is perpendicular to the orientation of said attachment surfaces. i.e., the attachment surfaces are pulled past each other rather than apart and away from each other, increasing the amount of time the two surfaces are in contact when being detached and increasing the effort required to detach the associated appendage.

In a further configuration, each appendage comprises multiple female attachment surfaces and each appendage opening in said body comprises multiple associated male attachment surfaces, each female attachment surface being planar and smaller in width than its associated appendage extremity and being positioned toward the body-facing end of said extremity facing radially outward from same, and having an associated male attachment surface, said associated male attachment surface being planar and positioned on the inner surface of its associated appendage opening such that said male and female surfaces are in contact when said appendage is received by its associated appendage opening and engageable at a point of contact by pressing together, said appendage being thereby detachably fastened to said body such that a pulling force applied to said appendage along its longitudinal axis is perpendicular to the orientation of said attachment surfaces, i.e., the attachment surfaces are pulled past each other rather than apart and away from each other, increasing the amount of time the two surfaces are in contact when being detached and increasing the effort required to detach the associated appendage.

In another configuration, each appendage comprises one or more female attachment surfaces, each respective female surface being planar and located on its respective appendage extremity or appendage strap, and the whole of the inner surface of the body inner cavity is lined with male attachment surfaces In another configuration, each appendage comprises one or more female attachment surfaces, each respective female surface being planar and located on its respective appendage extremity or appendage strap, and the whole of the inner surface of the body inner cavity is lined with male attachment surfaces In an embodiment of the present invention, attachment surfaces located on appendages are male attachment surfaces and attachment surfaces located on the body are female attachment surfaces.

In another embodiment, attachment surfaces located on appendages are female attachment surfaces and attachment surfaces located on the body are male attachment surfaces.

In another embodiment, attachment surfaces located on appendages and attachment surfaces located on the body are combinations of male and female attachment surfaces.

In an embodiment of the present invention, each appendage comprises one or more attachment surfaces, each attachment surface being located toward the body-facing end of its associated appendage extremity and having a corresponding complementary attachment surface, said complementary surface being positioned on the inner surface of its associated appendage opening such that said male and female surfaces are in contact when said appendage is received by its associated appendage opening and engageable at a point of contact by pressing together, said appendage being thereby detachably fastened to said body such that a pulling force applied to said appendage along its longitudinal axis is perpendicular to the orientation of said attachment surfaces, i.e., the attachment surfaces are pulled past each other rather than apart and away from each other, increasing the amount of time the two surfaces are in contact when being detached and increasing the effort required to detach the associated appendage.

In another embodiment, each appendage comprises one or more attachment surfaces, each attachment surface being located on the appendage strap of its associated appendage, and the whole of the inner surface of the body inner cavity is lined with a complementary attachment surface.

In an embodiment of the present invention, said arm, leg and head appendage straps are each made of bungee cord or some other suitable elastic cord material.

In another embodiment, said arm, leg and head appendage straps are each made of rope or some other suitable inelastic cord material.

In another embodiment, said arm, leg and head appendage straps are each made of cloth, plush, or some other suitable textile material.

In an embodiment, said arm, leg and head appendage straps each have a length of between 5 and 20 inches.

In another embodiment, said arm, leg and head appendage straps have respective terminal ends being securely attached to a point or points inside the body inner cavity, said appendages being thus detachable but not removable.

In another embodiment, said arm, leg and head appendage straps have respective terminal ends being unattached to the body; 302a, 302b, 303a, 303b, and 304 being the free terminal ends of the left and right arm, left and right leg, and head appendages, respectively. Each appendage is thus detachable and removeable from said body and can be swapped or replaced with an appendage from another reversibly-dismantlable pet toy, allowing for mixing of non-corresponding animal parts.

In an embodiment of the present invention, the head appendage strap has a terminal end which is unattached to the body and further comprises a pouch 300 located at said free terminal end in which a squeaking device 301 or pet treat can be placed.

To use the invention, in one embodiment, the terminal ends of the respective straps of said arm and leg appendages are inserted into the body inner cavity via the respective associated appendage openings; said straps are then pulled through the body and out of the head appendage opening until only the respective arm and leg appendage extremities remain outside said body. Said straps are then pushed through the head appendage opening into the body cavity, thus acting as stuffing for the body, after which the head appendage is attached by pushing the terminal end of the head appendage strap through the head appendage opening into said body cavity until only the head extremity remains outside said body. Said appendages are then fastened to said respective appendage openings. The individual appendages can then be detached and/or removed by pulling, after which they can be re-attached. The fastening means and straps of said appendages provide resistive force when said appendage is pulled outward: said straps additionally allow for intermediate stages of dismantlement between fully attached and fully removed appendages.

The embodiments shown and described above are only exemplary. Even though numerous characteristics and advantages of the present invention have been set forth in the foregoing description together with details of the methods of the present invention, the disclosure is illustrative only and changes may be made within the principles of the invention to the full extent indicated by the broad general meaning of the terms used herein. Various alterations, modifications and substitutions can be made to the methods of the disclosed invention and the fabrication system that implements the present invention without departing in any way from the spirit and scope of the invention.

What is claimed is:

1. A reversibly-dismantlable pet toy comprising:
a hollow body having five openings, each of said openings comprising an associated fastening means located therein or thereon and an associated appendage, said appendage comprising a complementary fastening means, said openings being dimensioned to admit their respective appendages, wherein said fastening means are a hook and loop type fastening system comprising a surface consisting of a plurality of hooks and a complementary surface consisting of a plurality of loops, or vice versa: said body thus having in or about each opening a surface consisting of a plurality of hooks and each of said appendages thus having at their body-proximal ends a surface consisting of a plurality of loops, or vice versa, such that when said surfaces are pressed together, said hooks and loops engage and said body and appendage are fastened to each other such that they may be separated with sufficient force;
five appendages being defined as the head, left and right legs, and left and right arms, respectively, each appendage being associated with one of said openings and defining a distal end as pointing away from said body and a proximal end as pointing toward said body, said appendages comprising at their body-proximal ends complementary fastening means to the fastening means of their associated body openings, such that said appendages may be thereby attached and detached from said body, wherein each appendage further comprises a flexible strap extending from its associated body-proximal end, said strap being inserted into said body opening before said appendage is fastened to said body.

2. The reversibly-dismantlable pet toy of claim 1 in which said head appendage further comprises at the distal end of its associated strap a pouch operable to hold a squeaker or treat.

3. The reversibly-dismantlable pet toy of claim 1 in which said straps are made of a flexible, soft textile material such as felt or cloth.

4. The reversibly-dismantlable pet toy of claim 1 in which said straps further comprise fastening means surfaces complementary to the fastening means surfaces located in or about the respective body openings associated with said straps, such that said straps engage said fastening means surfaces upon being pulled out of said body, adding to the effort required to remove said appendages.

5. The reversibly-dismantlable pet toy of claim 4 in which said strap fastening means surfaces are positioned at the free terminal ends of said straps.

6. The reversibly-dismantlable pet toy of claim 4 in which said strap fastening means surfaces are positioned along the entire length of said straps.

7. The reversibly-dismantlable pet toy of claim 4 in which said body openings are located one on the top and two on either side of said body.

8. The reversibly-dismantlable pet toy of claim 4 in which said body and said appendages are made of a textile material such as cloth or plush.

9. The reversibly-dismantlable pet toy of claim 4 in which said appendages are stuffed with a soft stuffing material such as cotton.

10. A reversibly-dismantlable pet toy comprising:
- a hollow body, said body being shaped to resemble an animal body, having fastening means corresponding to complementary fastening means on each appendage, an inner cavity and five openings on its outer surface leading to said inner body cavity, said openings being associated with the head, left and right arm, and left and right leg appendages, respectively, and being positioned on the top, left and right side, and lower left and right side of said body, respectively, and being made of a textile material such as cloth or plush;
- a head appendage, said head appendage being made of a textile material such as cloth or plush and being stuffed with a soft material such as cotton, and comprising a head appendage extremity being shaped to resemble or represent an animal head, a head appendage strap securely attached to the body-facing end of said head extremity, said strap extending from the point of its attachment to said head extremity outwards in the direction of said body, and a fastening means corresponding to a complementary fastening means on said body;
- left and right arm appendages, each being made of a textile material such as cloth or plush and being stuffed with a soft material such as cotton, and comprising an arm appendage extremity being shaped to resemble or represent an animal arm or front leg, an arm appendage strap securely attached to the body-facing end of said arm extremity, said strap extending from the point of its attachment to said arm extremity outwards in the direction of said body, and a fastening means corresponding to a complementary fastening means on said body; and
- left and right leg appendages, each being made of a textile material such as cloth or plush and being stuffed with a soft material such as cotton, and comprising a leg appendage extremity being shaped to resemble or represent an animal leg, an leg appendage strap securely attached to the body-facing end of said leg extremity, said strap extending from the point of its attachment to said leg extremity outwards in the direction of said body, and a fastening means corresponding to a complementary fastening means on said body.

11. The reversibly-dismantlable pet toy of claim 10 in which said fastening means are a hook and loop type fastening system; said body thus having at each opening a surface consisting of a plurality of hooks or loops and each of said appendages thus having at their body-proximal ends a surface consisting of a plurality of loops or hooks such that when said surfaces are pressed together, said hooks and loops engage and said body and appendage are detachably fastened to each other.

12. The reversibly-dismantlable pet toy of claim 10 in which said head appendage strap further comprises on its distal end a pouch operable to hold a squeaker or treat.

* * * * *